United States Patent [19]

Lona

[11] Patent Number: 5,225,021

[45] Date of Patent: Jul. 6, 1993

[54] PROCESS AND APPARATUS FOR THE CONTINUOUS PRODUCTION OF FIBRE-REINFORCED PLASTIC HOLLOW SECTIONS

[75] Inventor: Norbert Lona, Rorschacherberg, Switzerland

[73] Assignee: Futuretech AG, Vaduz, Liechtenstein

[21] Appl. No.: 777,461

[22] Filed: Oct. 15, 1991

Related U.S. Application Data

[63] Continuation of Ser. No. 318,436, Mar. 2, 1989, abandoned, which is a continuation of Ser. No. 8,587, Jan. 29, 1987, abandoned.

[30] Foreign Application Priority Data

Feb. 7, 1986 [CH] Switzerland ............... 498/86-7

[51] Int. Cl.⁵ .................................... B65H 81/00
[52] U.S. Cl. ................................ 156/190; 156/171; 156/173; 156/195; 156/203; 156/432; 156/466
[58] Field of Search ............... 156/171, 173, 175, 179, 156/180, 184, 190, 191–193, 195, 201, 203, 215, 311, 392, 428–432, 461, 425, 463, 466, 477.1; 138/153, 172, 177

[56] References Cited

U.S. PATENT DOCUMENTS

| | | | |
|---|---|---|---|
| 2,336,540 | 12/1943 | Graves | 156/190 X |
| 2,402,038 | 6/1946 | Goldman et al. | 156/190 |
| 2,623,445 | 12/1952 | Robinson | 156/193 X |
| 2,723,705 | 11/1955 | Collins | 156/195 |
| 2,760,549 | 8/1956 | Nash et al. | 156/432 X |
| 2,993,526 | 7/1961 | Young | 156/190 X |
| 3,033,729 | 5/1962 | Shobert | |
| 3,068,134 | 12/1962 | Cilker et al. | 156/228 X |
| 3,277,531 | 10/1966 | Boggs | 156/311 X |
| 3,385,179 | 5/1968 | Roe, Jr. | 156/195 |
| 3,531,357 | 9/1970 | Heckly | 156/425 |
| 3,579,402 | 5/1971 | Goldsworthy et al. | 156/432 X |
| 3,689,343 | 9/1972 | Elsner | |
| 3,698,988 | 10/1972 | Skobel | 156/432 X |
| 3,706,615 | 12/1972 | Nishiyama et al. | 156/192 X |
| 3,855,031 | 12/1974 | McNeely et al. | 156/190 |
| 4,026,747 | 5/1977 | DeLorean et al. | 156/195 X |
| 4,528,060 | 7/1985 | Gill et al. | 156/432 |

FOREIGN PATENT DOCUMENTS

| | | |
|---|---|---|
| 1134871 | 4/1957 | France. |
| 1407664 | 6/1965 | France. |
| 380366 | 9/1964 | Switzerland. |
| 897940 | 5/1962 | United Kingdom. |
| 1350298 | 4/1974 | United Kingdom. |
| 2078599 | 1/1982 | United Kingdom. |

*Primary Examiner*—Geoffrey L. Knable
*Attorney, Agent, or Firm*—Browdy and Neimark

[57] ABSTRACT

A stationary mandrel (1) is wrapped in a separating film (3) at the front, as seen in the draw-off direction (A). A gel coat layer is coated onto the film (3) and partly gelled by means of a heater (12). The gel coat layer is coated with liquid polyester, wrapped in a longitudinally extending glass-fibre fabric (20) in an overlapping manner and wound helically in a glass sliver (21). These layers are hardened by means of a further heater (24,25), so that a structural supporting profile for coating on the following layers is obtained. The mandrel (1) is set off after the further heater (24,25). For coating on the further layers, liquid polyester, a fibre fabric (34) and a helically wound sliver (37) are applied alternately. These layers are fulled and coated with an outer gel coat layer. The polyester is hardened in an oven (50). A grab device (52) draws the section off continuously from the mandrel (1). Finally, the section is cut to length. A hollow section of high strength is produced by means of this process.

11 Claims, 3 Drawing Sheets

PROCESS AND APPARATUS FOR THE CONTINUOUS PRODUCTION OF FIBRE-REINFORCED PLASTIC HOLLOW SECTIONS

This application is a continuation of application Ser. No. 07/318,436, filed Mar. 2, 1989, now abandoned, which is a continuation of application Ser. No. 07/008,587, filed Jan. 29, 1989, now abandoned.

U.S. Pat. No. 3,689,343 discloses a process and an apparatus for the production of fibre-reinforced hollow sections. In this known process, a gel coat layer is coated over part of the width of a separating film drawn off from a supply roll and is partly gelled. A fibre fabric is pressed onto the gel coat layer. This laminate is wrapped round a mandrel in such a way that the longitudinal edges of the gel coat layer and of the fibre fabric butt against one another. The projecting free longitudinal edges of the separating film are received in a slit in the mandrel. Resin-impregnated longitudinal roving strands are laid onto the hollow-section inner wall formed in this way. In a forming tool, these roving strands are wrapped in an outer wall, which likewise consists of a separating film, of a gel coat layer coated onto the latter and partly gelled and of a pressed-on fibre fabric, and are compressed radially. The resin sets in a heating device at the end of the forming tool. The hollow section is drawn off continuously at the rear end of the apparatus by a grab device and is cut to length by a crosscutting device.

The gel coat layer gives the hollow section produced a smooth surface and high corrosion resistance. A disadvantage of the hollow sections produced by this process is the abutting side edges of the gel coat layers which are only incompletely connected to one another after gelling. The unconnected longitudinal edges of the fibre fabrics also butt together at the same seam point, so that this seam point is vulnerable. Although the hollow section is pressed radially in the forming tool, nevertheless the pressing forces cannot be very high, because otherwise the friction in the forming tool and on the fixed mandrel would exceed the tensile strength of the hollow section. It is therefore impossible to prevent air intrusions, and this impairs the strength of the hollow section. The roving strands are only connected to one another by means of the synthetic resin. Although they increase the bending resistance and tensile strength of the hollow section, they nevertheless make no contribution to its strength against internal pressure. This is only moderate because of the seam points of the fibre fabrics.

The object of the invention is to provide a process and an apparatus for the continuous production of fibre-reinforced hollow sections, by means of which it is possible to produce hollow sections of high strength.

SUMMARY OF THE INVENTION

These objects and others are accomplished by a continuous process and its apparatus wherein a separating layer is first wrapped about a stationary mandrel in an overlapping fashion. A gellable coating is then applied to the separating layer and is partially hardened. Then, a first layer of fiber material, in liquid plastic, is wrapped about the release layer in an overlapping manner and the liquid plastic hardened by interal heating. The hardened section thus formed is self-supporting and is slid off the mandrel. Further layers of liquid plastic and fiber material are similarly wrapped about the hardened section. The section is pulled along the apparatus by a grabber at the outlet end and directed to a cutter, which cuts the hollow section to the disired length.

Because the inner gel coat layer is coated onto the separating film on the mandrel, it is seamless and guarantees reliable protection of the fibre-reinforced plastic layers. The overlapping of the innermost fibre layer and the hardening of the plastic contained in it give the hollow section sufficient strength, so that the mandrel can be offset after the third heating device. It is then no longer necessary for the mandrel to provide support in order to apply the further fibre layers impregnated with plastic, so that the air inclusions in these layers can be largely removed, especially by fulling, without the friction on the mandrel thereby being increased. It is possible, in addition, to wind at least some of the further layers, without consequently increasing the friction on the mandrel. A high strength against internal pressure of the hollow section can therefore be achieved.

GB Patent Specification 1,350,298 likewise makes known a process and an apparatus for producing fibre-reinforced plastic sections. On a flat plane web, a continuously supplied separating film is coated with gel coat and the gel coat is partly gelled. Liquid synthetic resin and a fibre ribbon are applied to the gel coat layer. Subsequently, the laminate, plane up to then, is shaped into a section, and the synthetic resin is hardened in a continuous oven. GB Patent Specification 1,350,298 mentions that the longitudinal edges of the laminate could be overlapped and therefore a hollow section produced. However, this is not possible because the separating film would prevent the overlapped longitudinal edges from being connected. A pressure-resistant hollow section of high strength cannot be produced in this way.

U.S. Pat. No. 3,033,729 discloses a process and an apparatus for the continuous production of glass-fibre-reinforced plastic pipes. Here, roving strands are conveyed through a bath containing liquid synthetic resin and are fed peripherally to a heated mandrel in an approximately axial direction. The synthetic resin is hardened partially as a result of this heating. Roving strands are wound onto the semy-hardened synthetic resin, and finally the synthetic resin is set in a continuous oven. In this process, it is impossible to provide the pipe with an inner gel coat layer. The semy-hardened synthetic resin is insufficiently stable, so that the roving strands can only be wound loosely, but on the other hand is not liquid enough to ensure that the wound roving strands would bond reliably with the resin. For these reasons, the pipe produced by this process contains many air inclusions, is leaky and has only moderate strength.

Brief Description of the Drawing

An exemplary embodiment of the invention is explained below with reference to the drawing. In the drawing.

Description of the Preferred Embodiment

Figure 1:
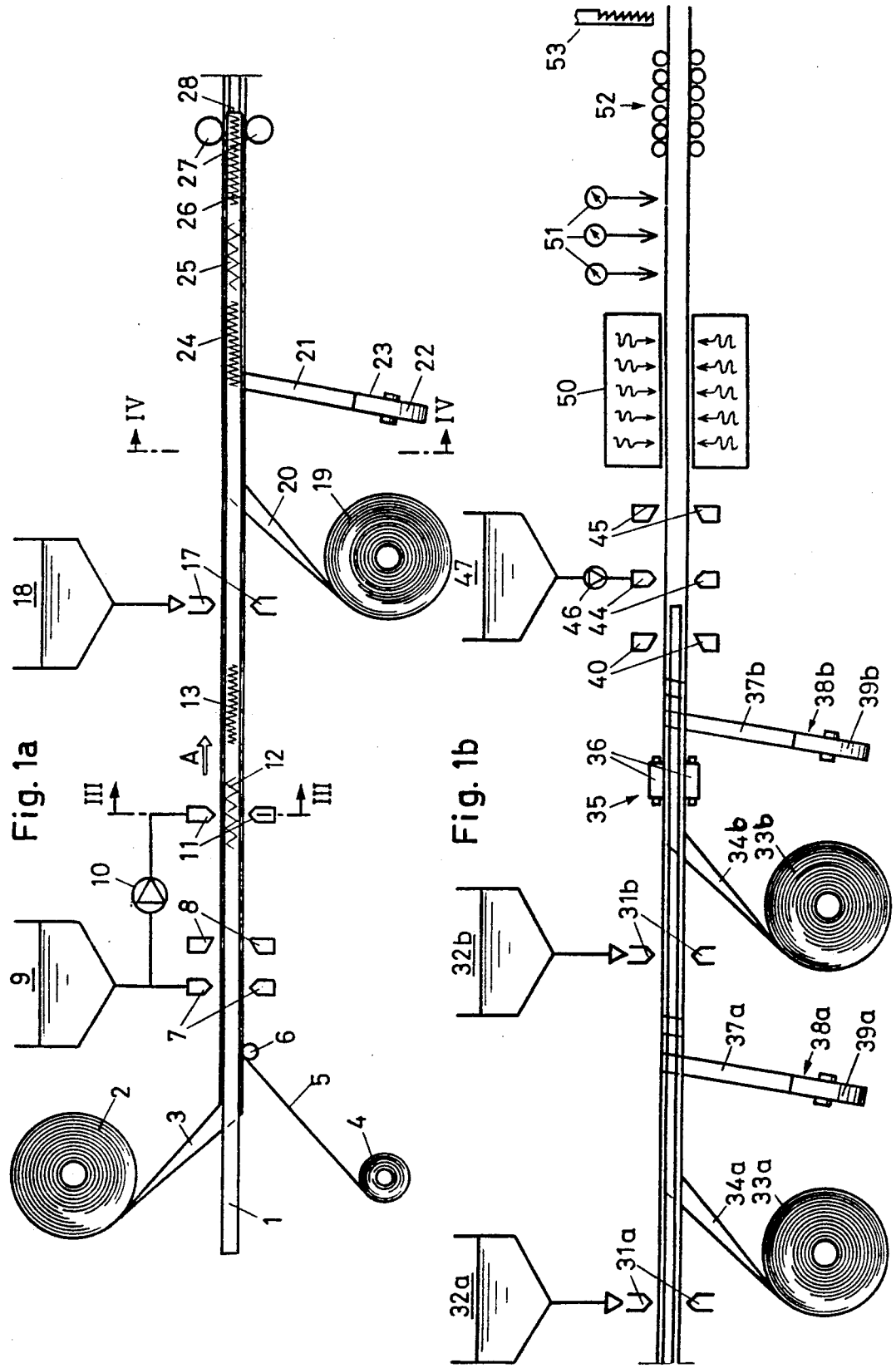
FIGS. 1a and 1b show a diagrammatic representation of the apparatus.

In FIG. 1, the apparatus is shown diagrammatically for a better understanding of the individual process steps, FIG. 1b following FIG. 1a on the right.

A separating film 3 drawn off from a strip magazine 2 mounted fixed in place is first applied to a stationary mandrel 1. The film 3 wraps round the mandrel 1. Its longitudinal edges overlap one another. The outer overlapping longitudinal edge is fixed to the overlapped longitudinal edge by means of an adhesive tape 5 drawn off from a supply roll 4. The adhesive tape 5 is pressed on by means of a roller 6. The separating film 3 thus forms a tubular separating layer which slides on the mandrel 1.

Behind the roller 6, liquid gel coat is coated in a thickness of approximately 0.4 mm onto the separating film 3 via an annular feed device 7 with an annular gap and is calibrated by means of an annular orifice plate 8, so that a seamless gel coat layer forms round the film 3. A duroplastic, for example a polyester with a high softener fraction, is suitable as a gel coat. The gel coat layer is more elastic than the fibre-reinforced duroplastic to be applied subsequently and because of its composition can be adapted to the intended use. The liquid gel coat is supplied to the feed device 7 from a vessel 9.

Behind the annular orifice plate 8 in the draw-off direction A of the section, the mandrel 1 is heated by a heater 12, so that the gel coat layer is partially gelled here. The heat transmission is very good as a result of direct contact between the film 3 and the mandrel 1, so that the temperature necessary for the gelling of the gel coat layer can be reached over a short distance and this layer can be prevented from overheating. After the heater 12, the mandrel 1 is cooled by means of a cooling coil 13.

When larger layer thicknesses of the gel coat layer are desired, by means of nozzles 11 pivotable about the mandrel axis a second layer is sprayed over the first layer, applied by means of the feed device 7, in the region of the heater 12, that is to say at a point where the viscosity of the first layer is already substantially higher. The liquid gel coat is supplied to the nozzles 11 from the vessel 9 by means of a pump 10. For even larger wall thicknesses, several of these spray devices can be arranged in succession, the heater 12 being extended correspondingly. Applying the gel coat layer in several layers ensures that, despite the effect of gravity, the layer has a uniform wall thickness over the circumference.

Via an annular feed device 17 with an annular gap, liquid duroplastic from a vessel 18 is now coated onto the gelledon gel coat layer. A woven glass fabric 20 is drawn off from a supply roll 19 with a fixed axle. This glass fabric is applied to the duroplastic layer in the longitudinal direction of the hollow section with overlapping longitudinal edges. A further woven glass fabric 21 is drawn off from a supply roll 22, mounted in a magazine 23 rotatable about the mandrel axis, and is looped helically round the fabric 20 in an overlapping manner. Behind this magazine 23 in the draw-off direction A, the mandrel 1 is heated by a further heater 24, 25, a first heating coil 24 utilizing the waste heat from the cooling coil 13 and/or a subsequent further cooling coil 26. In this way, the energy consumption for heating can be kept low. Heat recovery becomes possible as a result of the direct heat transmission via the mandrel. During transit through the heaters 24, 25, the duroplastic is hardened, so that a thin-walled fibre-reinforced duroplastic hollow section is obtained as a supporting section for the layers to be applied subsequently. This supporting section is supported via supporting rollers 27 which run on the already hardened fibre-reinforced duroplastic. After the heater 25, the mandrel has the abovementioned further cooling coil 26, in order to cool the supporting profile so that the duroplastic layers to be applied subsequently do not harden prematurely. The supporting section is sufficiently rigid for the following operations, so that after the cooling coil 26 a step 28 is provided on the mandrel so as to reduce the latter to a smaller diameter. The mandrel 1 can also end at this point.

In each of several successive stages a, b, liquid duroplastic, a longitudinally extending glass-fibre fabric 34 and a helically wound glass-fibre sliver 37 are applied to the now inherently stable supporting section. Here, the feed devices 31a, 31b for duroplastic, with the exception of the inside diameter, correspond to the device 17, and the vessels 32a, 32b correspond to the vessel 18. The woven glass-fibre fabrics 34a, 34b, like the fabric 20, are drawn off from supply rolls 33a, 33b mounted fixed in place. Their longitudinal edges likewise overlap one another, the overlap points being offset relative to one another in the peripheral direction. For this purpose, the axes of rotation of the supply rolls 19, 33a, 33b are also arranged distributed round the mandrel axis. In FIG. 1b, merely for the sake of greater clarity, they are shown arranged successively in line in the axial direction of the mandrel. A woven glass-fibre sliver 37a, 37b is looped helically round each glass fibre fabric 34a, 34b in an overlapping manner and is pressed radially as a result of the sliver tension, so that the layers 34a, 37a and 34b, 37b are impregnated with the previously applied duroplastic and air inclusions are substantially forced out. This purpose is also served by a fulling device 35 rotatable about the mandrel axis and having several rollers 36 distributed uniformly over the periphery of the hollow section. The fulling device 35 can be arranged in front of or behind the last sliver station 37b, 38b, 39b. The hollow section is now drawn through a calibrating orifice plate 40, in which the section wall is compressed and excess duroplastic is stripped off. Behind the calibrating orifice plate 40, an outer gel coat layer is sprayed on by means of several nozzles 44 pivotable about the mandrel axis and is calibrated in a further calibrating orifice plate 45. The liquid gel coat, for example once again a polyester with a high softener fraction, is fed to the nozzles 44 from a vessel 47 via a pump 46.

The hollow section then passes through a continuous oven 50, in which the duroplastic and the outer gel coat layer are heated from outside and hardened, and through several measuring stations 51 for checking the diameter, wall thickness and hardness.

The now finished hollow section is drawn off continuously from the mandrel 1 by a grab device 52 and is cut to the desired section length by a crosscutting device 53. Suitable grab and crosscutting devices are known from extrusion machines for solid sections.

Figure 2:
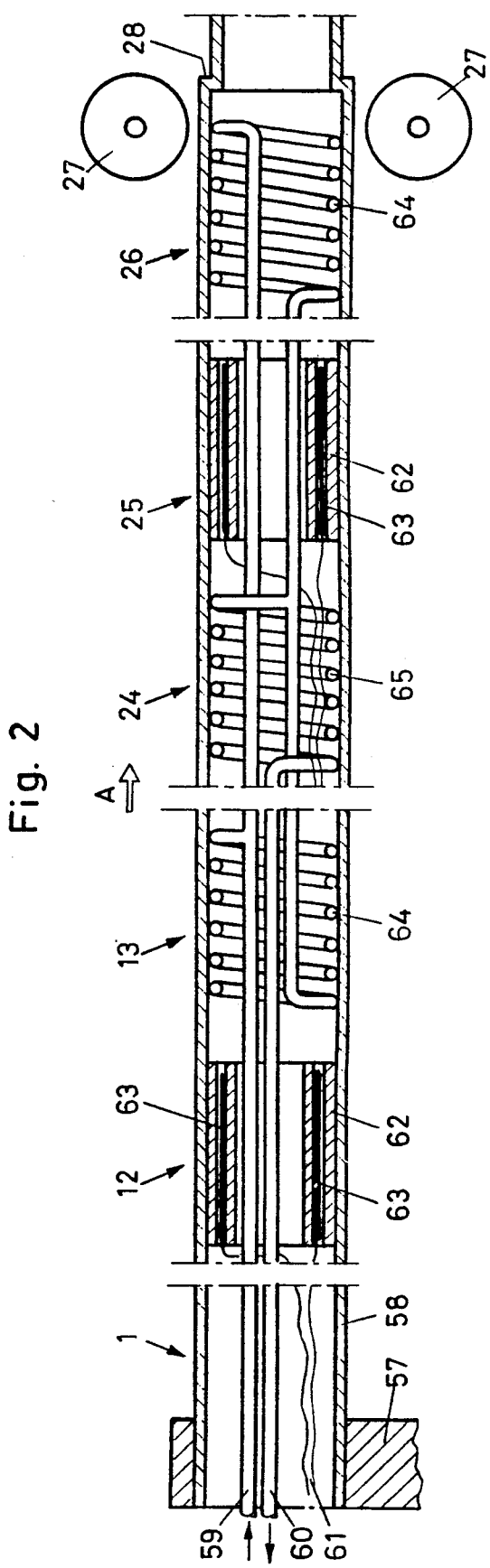
FIG. 2 shows a longitudinal section through the mandrel.

FIG. 2 shows a longitudinal section through the mandrel 1 with the heating and cooling devices. The mandrel 1 is clamped in a bearing stand 57 and consists of a steel tube, through which are guided a feed pipe 59 and a return pipe 60 for cooling water and electrical leads 61 for the heating. The heaters 12 and 25 each comprise an aluminium or copper sleeve 62 resting against the inside of the tube 58 and having several thermostatically controlled electrical heating bars 63 distributed uniformly over the periphery. The heating bars 63 are connected electrically to one another in each heater 12, 25 and are each connected to one of the leads 61. The cooling devices 13 and 26 each consist of a coiled tube 64 which is connected to the tube 58 in a thermally conductive manner and of which the rear end, as seen in the draw-off direction A, is connected to the feed pipe 59 and the front end is connected to the rear end of a further coiled tube 65 forming the preheater 24. The front end of the coil 65 is connected to the return pipe 60. The preheater 24 thus utilizes the waste heat of the two cooling devices 13, 26.

Figure 3:
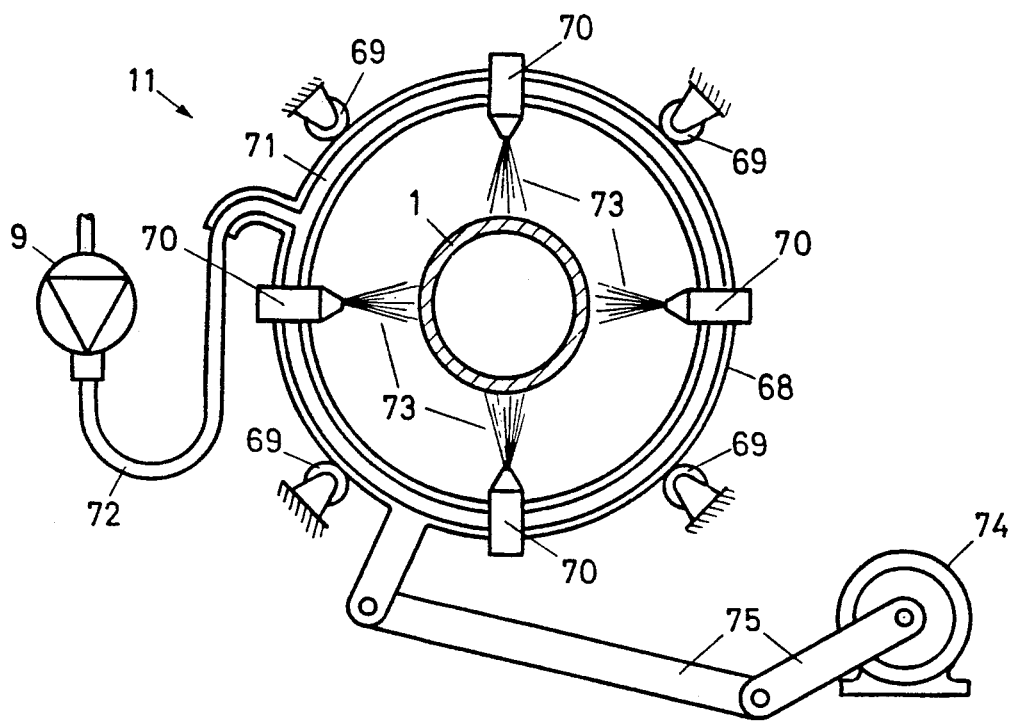
FIG. 3 shows a cross-section along the line III—III in FIG. 1.

FIG. 3 shows a cross-section through the device 11 for coating on the inner gel coat layer. An annular carrier 68 is mounted on rollers 69 so as to be rotatable about the axis of the mandrel 1. Four spray nozzles 70 directed radially inwards are fastened in a uniform distribution on the periphery of the carrier 68. The spray nozzles 70 are supplied with liquid gel coat through a distributor pipe 71 via a flexible hose 72 by the pump 9. Furthermore, a compressed-air line (not shown) for atomizing the gel coat material is connected to the spray nozzles 70. The nozzles 70 can be fastened to the carrier 68 so as to be radially adjustable, to make it possible to produce hollow sections of differing inner dimensions after the mandrel 1 has been exchanged. The gel coat material emerges from the nozzles 70 as a fine spray jet 73. To obtain a uniform thickness of the gel coat layer, the carrier 68 is pivoted to and fro about the mandrel axis by means of a motor 74 and a crank mechanism 75. The device 44 for coating on the outer gel coat layer is of the same design as the device 11 shown in FIG. 3.

Figure 4:
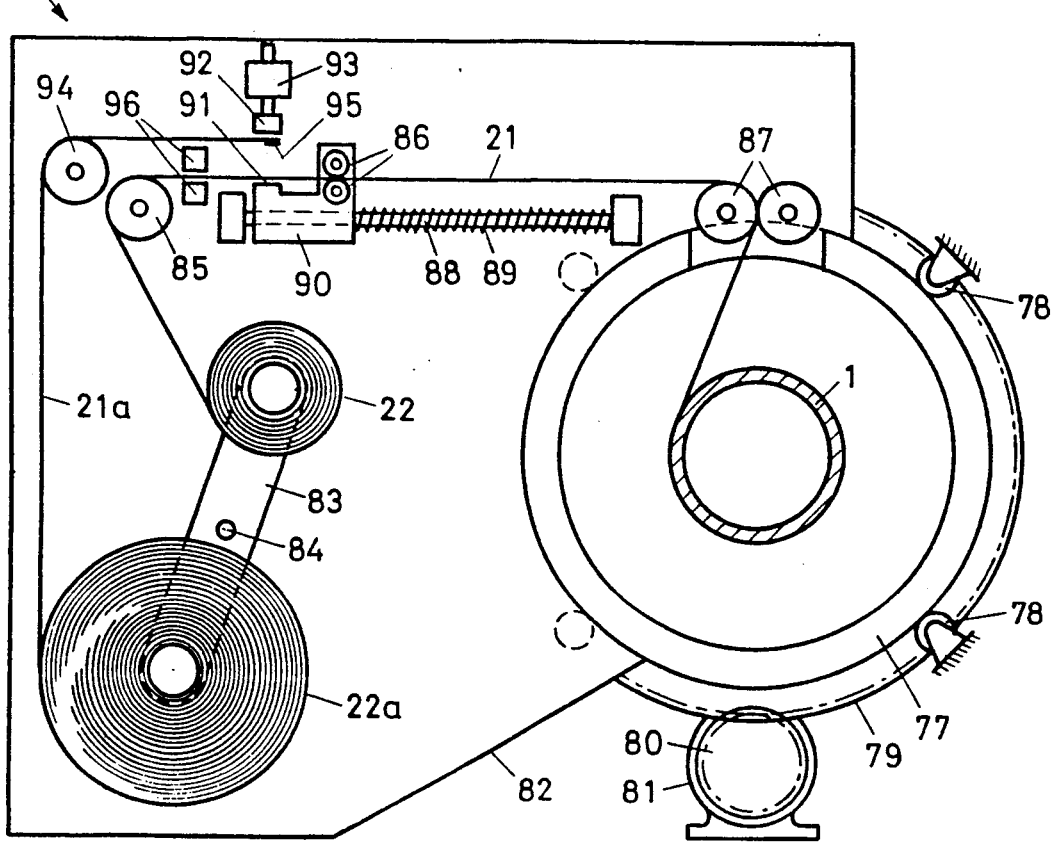
FIG. 4 shows a cross-section along the line IV—IV in FIG. 1.

FIG. 4 illustrates the feed of the glass-fibre sliver 21 from the sliver magazine 23. The sliver magazine 23 comprises a tubular carrier 77 which is arranged coaxially relative to the mandrel 1 and which is mounted so as to be rotatable about the mandrel axis, for example by means of rollers 78, and is driven via a toothed ring 79 by means of the pinion 80 of a motor 81. Welded to the carrier 77 so as to project radially is a carrier plate 82. Fastened to this so as to be rotatable about an axle 84 are a holder 83 for the supply roll 22 and a reserve roll 22a. The holder 83 engages in the position shown and in a position rotated through 180°. The sliver 21 is guided via a deflecting roller 85, a pair of rollers 86 and a further pair of rollers 87 braked in order to regulate the sliver tension. The pair of rollers 86 is fastened to a slide 90 displaceable along a rod 88 and biassed into the basic position shown by a spring 89. The slide 90 has a press surface 91 over which the sliver 21 is guided. Opposite the press surface 91, a pressing beam 92 is mounted displaceably on the slide 90. The beam 92 can be pressed against the press surface 91 by means of a solenoid 93. The sliver start 21a of the reserve roll 22a is guided round a further deflecting roller 94. The front end of the sliver start 21a is fastened to the beam 92 so as to be easily releasable. A double-sided unsupported adhesive tape 95 is glued onto its underside, facing the sliver 21.

During operation, the carrier 77, and with it the entire sliver magazine 23, rotates at a uniform speed about the axis of the mandrel 1 according to the draw-off speed of the section from the mandrel 1, in such a way that the longitudinal edges of the sliver 21 overlap one another. When the supply roll 22 is used up, the sliver end is detected by a light barrier 96 and the solenoid 93 is consequently actuated The beam 92 now presses the front end of the sliver start 21a of the reserve roll 22a, together with the adhesive strip 95, against the rear end of the sliver 21 and connects these two ends to one another. During pressing, the slide 90 runs together with the sliver 21 against to the force of the spring 89. The solenoid 93 is cut off again with a predetermined delay, so that the slide 90 returns to the basic position illustrated. The sliver magazine 23 rotates relatively slowly about the mandrel axis, so that the following operations to introduce a new reserve roll can be carried out by hand. The holder 83 is first pivoted 180° in the clockwise direction, and the sliver start 21a is transferred from the deflecting roller 94 to the deflecting roller 85 and threaded into the light barrier 96. A new reserve roll 22a is attached onto the now empty mandrel of the holder 83, an adhesive tape 95 is glued onto the front end of its sliver start, and this end is fastened to the beam 92. The sliver magazine 23 is thus ready once again for the next sliver change.

The sliver magazines 38a and 38b are of the same design as the magazine 23 shown in FIG. 4. The automatic connection, shown in FIG. 4, between the sliver end of a supply roll and the sliver start of a reserve roll is basically also possible for the glass-fibre fabrics 20, 34a and 34b and for the separating film 3 and the adhesive tape 5. However, since the draw-off speeds of the fabrics 20, 34, the film 3 and the adhesive tape 5 are substantially lower than the draw-off speed of the sliver 21, it is more expedient here to exchange the supply rolls and connect the sliver ends purely manually.

For fibre reinforcement, instead of glass fibres, for example also carbon fibres, aramide fibres or silicate fibres are suitable. Duroplastics, especially polyesters, are basically suitable as binders. Hollow sections of any outline can be produced by means of the process, provided that the outer contour does not have any concavities. The process is particularly suitable for producing pipes of circular cross-section.

I claim:

1. An apparatus for continuous production of fiber reinforced plastic hollow sections, comprising:
   a) a stationary mandrel (1) having a longitudinal extension;
   b) means (2) for applying a flexible separating film (3) around said mandrel (1) so that longitudinal edges of said film (3) overlap and extend substantially parallel to the longitudinal extension of the mandrel;
   c) means (7,11) for applying a liquid gel coat around said film (3) on said mandrel;
   d) a first curing means (12) for partly gelling said gel coat to form a seamless gel coat layer on said film;
   e) fiber material applying means (17,19,23) including means for applying a liquid plastic and a first innermost woven band (20) of fiber material around said gel coat layer, so that longitudinal edges of said first band overlap and extend substantially parallel to the longitudinal extension of the mandrel, and means for helically winding a second band (21) of fiber material around said first band (20), whereby the first and second band are soaked with the liquid plastic;
   f) a second curing means (24,25) for curing the plastic contained in said first and second band to form a self supporting hardened skeleton hollow section;
   g) means (31,33,38) for applying further liquid plastic around said skeleton hollow section further including means for wrapping a plurality of further bands (34,37) of fiber material around said skeleton hollow section;

h) a third curing means (50) for curing the further liquid plastic in said further bands on said skeleton hollow section; and i) means (52,53) for drawing off the hardened hollow section continuously from said mandrel (1) and for cutting said hardened hollow section to length;

wherein the mandrel (1) is offset or ends between the second curing means (24,25) and the means (31) for wrapping a plurality of further bands (34, 37) around said skeleton hollow section.

2. An apparatus according to claim 1, wherein said first and second curing means (24,25,12) are mounted inside said mandrel (1).

3. An apparatus according to claim 2, wherein a cooling device (13,26) is arranged downstream of both the first and second curing means (24,25,12) in said mandrel (1).

4. An apparatus according to claim 1, further comprising, downstream of said means for wrapping said further bands and upstream of said third curing means, a calibrating device (40) for calibrating the outside dimension of the hollow section, and means (44) for applying an outer gel coat layer on said calibrated hollow section.

5. An apparatus according to claim 1, wherein said means (33, 38) for wrapping a plurality of further bands (34, 37) comprises, in succession, pairs composed of a first stationary band magazine (33) for applying the respective band (34) around the skeleton hollow section with its longitudinal edges being substantially parallel to the longitudinal extension of the mandrel and a second band magazine (38) rotatable about the skeleton hollow section for helically winding the respective band.

6. A process for the continuous production of fiber-reinforced hollow sections, comprising the steps of:

a) applying a flexible separating film (3) around a stationary mandrel (1) so that longitudinal edges of said film (3) overlap and extend substantially parallel to the longitudinal extension of the mandrel;

b) applying a liquid gel coat around said film (3) on said mandrel;

c) partly gelling said gel coat by a first curing means (12) to form a seamless gel coat layer on said film;

d) applying a liquid plastic around said gel coat layer, applying a first innermost woven band (2) of fiber material around said gel coat layer so that longitudinal edges of said first band overlap and extend substantially parallel to the longitudinal extension of the mandrel, and helically winding a second band (21) of fiber material around said first band (20), whereby the first and second band are soaked with the liquid plastic;

e) curing the plastic contained in said first and second band by a second curing means (24,25) to form a self supporting hardened skeleton hollow section;

f) applying further liquid plastic around said skeleton hollow section and wrapping a plurality of further bands (34,37) of fiber material around said skeleton hollow section with a means for wrapping;

g) curing the further liquid plastic in said further bands on said skeleton hollow section by a third curing means (5); and i) continuously drawing off the hardened hollow section from said mandrel (1) and cutting said hardened hollow section to length;

wherein the mandrel (1) is offset or ends between the second curing means (24,25) and the means (31) for wrapping a plurality of further bands (34, 37) around said skeleton hollow section.

7. A process according to claim 6, wherein the mandrel (1) is heated from inside by the first and second means (24,25,12).

8. A process according to claim 7, wherein the mandrel (1) is cooled downstream of the first and second curing means.

9. A process according to claim 6, further comprising the steps of calibrating the outside dimension of the hollow section and applying an outer gel coat layer on said calibrated hollow section after step f) and before step g).

10. A process according to claim 6, wherein the gel coat layer is composed of at least two sublayers, and wherein the second sublayer is sprayed onto the first applied sublayer after starting to heat the first sublayer.

11. A process according to claim 6, wherein step f) comprises, in alternating succession:

applying a first one of said further bands (34) around the skeleton hollow section with its longitudinal edges being substantially parallel to the longitudinal extension of the mandrel, and helically winding a second one of said further bands (37) around said first one of said further bands.

* * * * *